(12) United States Patent
Dumortier et al.

(10) Patent No.: US 6,598,089 B1
(45) Date of Patent: Jul. 22, 2003

(54) METHOD OF SUPPORTING COMMUNICATION BETWEEN NETWORK NODES

(75) Inventors: Philip Dumortier, Turnhout (BE); Dirk Ooms, Antwerpen (BE); Wim Livens, Reet (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/545,324

(22) Filed: Apr. 7, 2000

(30) Foreign Application Priority Data

Apr. 20, 1999 (EP) .............................. 99440081

(51) Int. Cl.$^7$ ............................ G06F 15/173
(52) U.S. Cl. ................. 709/238; 709/220; 709/230; 370/352
(58) Field of Search ................. 709/220, 221, 709/223, 230, 238; 370/352, 395

(56) References Cited

U.S. PATENT DOCUMENTS 6,301,254 B1 * 10/2001 Chan et al. ................. 370/397
6,374,303 B1 * 4/2002 Armitage et al. ........... 709/242
6,408,001 B1 * 6/2002 Chuah et al. ............... 370/392

OTHER PUBLICATIONS

Dumortier: "Toward a New IP over ATM Routing Parardigm" IEEE Communications Magazine, Jan. 1998, pp. 82–86, XP002115183, US paragraphs "Shortcut Routing"; Trigger Event.

Le Faucheur F: "Ietf Multiprotocol Label Switching (MPLS) Architecture" 1st IEE International Conference on ATM, ICATM '98 proceedings of ICATM '98: IEE International Conference on ATM, Jun. 22, 1998, pp. 6–15, XP002115225.

Viswanathan A. et al: "Evolution of Multiprotocol Label Switching" IEEE Communications Magazine, vol. 36, No. 5, May 1, 1998, pp. 165–173, XP000752861, ISSN: 0163–6804, paragraph "Label Distribution and Forwarding", paragraph "Routing Heirarchy and Label Stacking".

X. XIAO: "Internet QOS: A Big Picture" IEEE Network, col. 13, No. 2, Mar. 1999, pp. 8–18, XP002115238 US, paragraph "An Introduction to MPLS".

* cited by examiner

*Primary Examiner*—Mehmet B. Geckil
(74) *Attorney, Agent, or Firm*—Sughrue Mion, PLLC

(57) ABSTRACT

The invention relates to a method of supporting communication between a first network node (AH1) and a second network node (ISR1) of a communications network (KN), to the communications network, to the first and second network nodes, and to a switch controller for the second network node for carrying out the method. Between the second network node (ISR1) and one or more further network nodes (ISR2, ISR3) of the communications network, information about label resources is exchanged using a label distribution protocol (LDP), whereby the establishment of shortcuts, each of which is formed by a direct Layer 2 connection assigned to a Layer 3 forwarding relationship, is made possible between the second network node (ISR1) and the further network nodes (ISR2, ISR3). The first network node (AH1) is preconfigured with a set of label resources. The second network node (ISR1) manages the assignment of the label resources available for a connection between the first network node (AH1) and the second network node (ISR1) and preconfigured in the first network node (AH1). The second network node (ISR1) assigns to a shortcut one of the labels from the set of label resources which are available for the connection with the first network node (AH1) and are preconfigured in the first network node (AH1), thus extending this shortcut through the second network node (ISR1) to the first network node (AH1).

10 Claims, 2 Drawing Sheets

METHOD OF SUPPORTING COMMUNICATION BETWEEN NETWORK NODES

BACKGROUND OF THE INVENTION

This invention relates to a method of supporting communication between a first network node and a second network node of a communications network, wherein information is exchanged about label resources between the second network node and one or more further network nodes of the communications network using a label distribution protocol, whereby the establishment of shortcuts, each of which is formed by a direct Layer 2 connection assigned to a Layer 3 forwarding relationship, is made possible between the second network node and the further network nodes. The invention is further directed to a communications network comprising these network nodes, with the second network node and the one or more further network nodes comprising switch controllers which are designed to exchange information about label resources using a label distribution protocol. The invention is further directed to the network nodes and switch controllers used in such a method and network.

The invention is based on a new forwarding concept for integrating, for example, IP (=Internet Protocol) and ATM (=Asynchronous Transfer Mode), the multiprotocol label switching (MPLS) concept. This concept combines the Layer 2 functionality—e.g., ATM switching—and the Layer 3 functionality—e.g., IP routing. Network nodes which follow this concept are referred to as "integrated switch routers". They are composed of a Layer 3 router, a switch controller, and a Layer 2 switch.

One pre-MPLS technology for implementing multiprotocol label switching is the Ipsilon flow switching concept. Forwarding decisions in Layer 3 are made only for the first data packets of a flow. Then, the associated Layer 3 forwarding relationship is assigned a shortcut, which is formed by a direct Layer 2 connection. The establishment of such shortcuts is based on the fact that information about available label resources and about the assignment of labels to shortcuts is exchanged between the network nodes of the multiprotocol label switching domain. The label resources are thus managed jointly by the network nodes of the multiprotocol label switching domain, and the establishment of shortcuts is thus coordinated. Without the exchange of this information, the establishment of a shortcut is not possible. The advantage of this concept is that after establishment of a shortcut, no Layer 3 forwarding decisions need be made in the multiprotocol label switching domain, whereby the user data communication can be considerably accelerated.

SUMMARY OF THE INVENTION

The invention has for its object to further accelerate the user data communication in a mixed network environment with LDP-capable network nodes and non-LDP-capable network nodes.

This object is attained by a method of supporting communication between a first network node and a second network node of a communications network, the method comprising exchanging information about label resources between the second network node and one or more further network nodes of the communications network using a label distribution protocol, whereby the establishment of shortcuts, each of which is formed by a direct Layer 2 connection assigned to a Layer 3 forwarding relationship, is made possible between the second network node and the further network nodes, wherein the first network node, instead of exchanging information about label resources with the second network node using a label distribution protocol, is preconfigured with a set of label resources, that the second network node manages the assignment of the label resources available for a connection between the first network node and the second network node and preconfigured in the first network node, and that the second network node assigns to a shortcut one of the labels of the preconfigured set of label resources which are available for the connection with the first network node, thereby extending the shortcut through the second network node to the first network node.

The invention further resides in a network, network nodes and switch controllers for implementing this method, all as described in more detail below.

The idea underlaying the invention is to extend a shortcut from an LDP-capable network node of an MPLS domain towards a non-LDP-capable network node which does not exchange information about label resources with the network nodes of this MPLS domain. To make this possible, the non-LDP-capable network node is preconfigured with a set of label resources. The LDP-capable network node connected to the non-LDP-capable network node manages the labels available for the connection between these network nodes, and assigns these labels to shortcuts without interacting with the non-LDP-capable network node.

One advantage of the invention is that this allows a user data stream to be forwarded via a shortcut up to the host, so that user data communication is accelerated and the calculating capacity necessary therefor is reduced.

Another advantage of the invention is that in spite of that advantage being gained, the non-LDP-capable network node can be considerably simpler in construction than an LDP-capable network node, because it need not process a label distribution protocol, for example. This makes the use of this solution in access nodes particularly attractive. As no internal communication takes place between the LDP-capable network node and the non-LDP-capable network node, the bandwidth available for user data communication between these network nodes is greater than with two comparable LDP-capable network nodes.

A further advantage of the invention is that it can be incorporated into existing communications systems at low cost.

Further advantageous features of the invention are defined in the subclaims.

BRIEF DESCRIPTION OF THE DRAWINGS

The invention will become more apparent from the following description of several embodiments when taken in conjunction with the accompaniying drawings, in which.

DETAILED DESCRIPTION OF THE INVENTION

Figure 1:
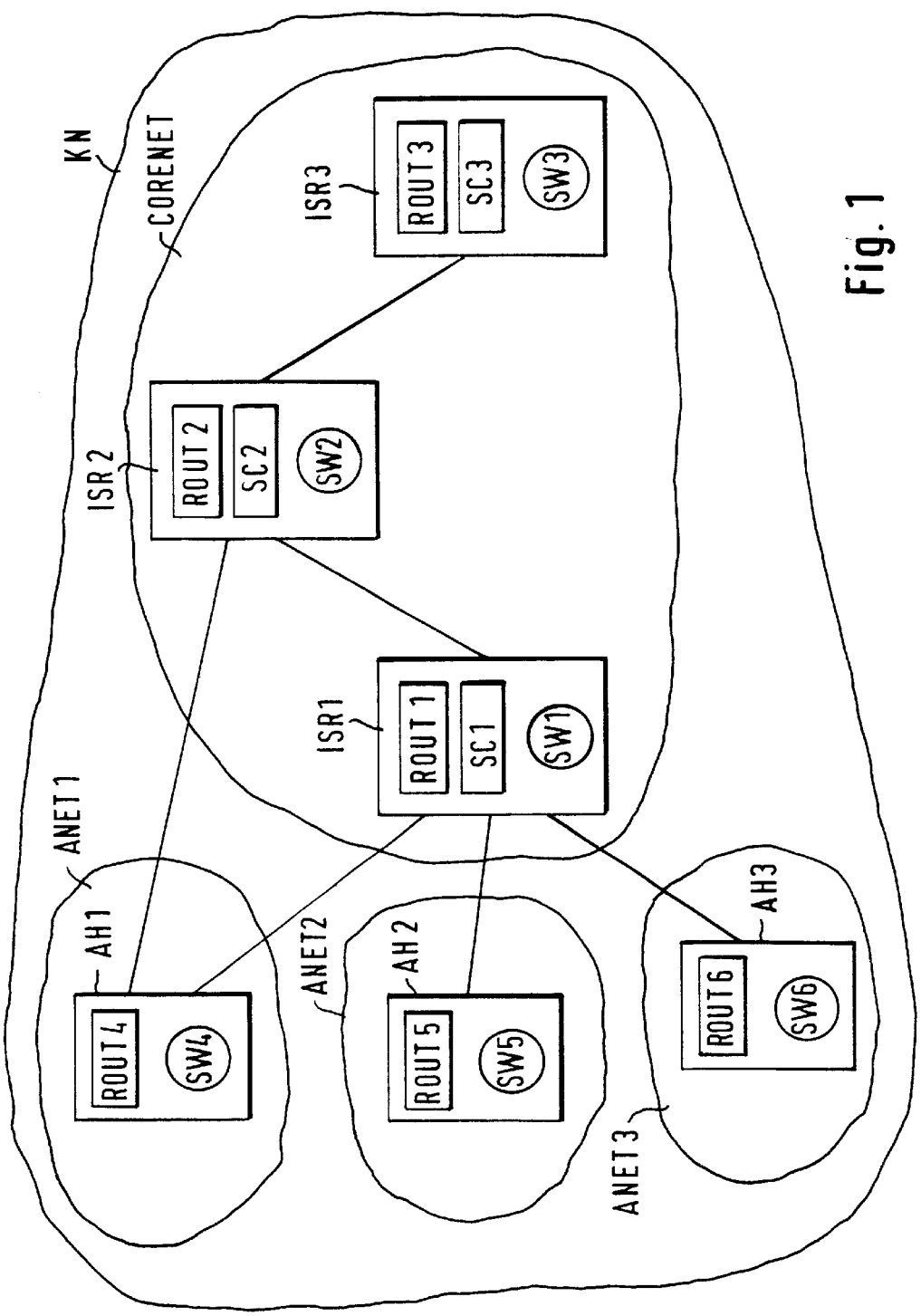
FIG. 1 is a block diagram of a communications network according to the invention with several network nodes according to the invention.

FIG. 1 shows a communications network KN which has several subnetworks CORENET, ANET1 to ANET3. The number of subnetworks CORENET and the number of subnetworks ANET1 to ANET3 have been chosen as an example.

The communications network KN represents a data communications network. It is formed by a plurality of interconnected network nodes.

The subnetwork CORENET advantageously performs the function of a core or backbone network within the communications network KN, through which a large amount of data is routed. It is formed by several interconnected network nodes which together constitute a multiprotocol label switching domain. This domain is characterized by the fact that data assigned to a Layer 3 forwarding relationship can be transported through the domain via a direct Layer 2 connection, also referred to as a "shortcut", thus eliminating the need to process intermediate Layer 3 routing functions. The establishment of shortcuts requires that the network nodes of the domain which are affected by a shortcut communicate with one another using a label switching protocol.

The subnetworks ANET1 to ANET3 advantageously perform the functions of access networks within the communications network KN. Each of them has one or more network nodes. The network nodes of the subnetworks ANET1 to ANET3 are not tied into the exchange of information between network nodes of the subnetwork CORENET using the label switching protocol.

Of the network nodes of the subnetworks ANET1 to ANET3, which perform Layer 3 routing functions, FIG. 1 shows as example one network node per subnetwork, namely network nodes AH1 to AH3. These network nodes are assigned to end users or form the host of the respective access network. It is also possible, of course, that the network nodes AH1 to AH3 are network nodes of a non-LDP-capable backbone network which perform Layer 3 routing functions.

Each of the network nodes AH1 to AH3 consists of a hardware platform and a software platform form application programs for controlling the functions of the respective network node AH1 to AH3. From a functional point of view, each of the network nodes AH1 to AH3 incorporates a Layer 2 switching function SW4, SW5, SW6 and a Layer 3 router function ROUT4, ROUT5, ROUT6.

The structure of the network nodes AH1 to AH3 will now be explained using the network node AH1 as an example.

The Layer 3 router function ROUT4 provides the Layer 3 protocol functions for data communication using the IP protocol. The Layer 2 switching function SW4 provides the Layer 2 protocol functions for e. g. ATM as the Layer 2 protocol. Furthermore, the network node AH1 is preconfigured with a set of label resources. If ATM is used as Layer 2, label resources may be formed, for example, by pre-established Layer 2 VP/VC (VC=Virtual Channel, VP=Virtual Path in ATM). The label resources from the set of label resources are preconfigured either for the connection with the network node ISR1 or for the connection with the network node ISR2. The network node AH1 accepts all packets to which such a preconfigured label from the set of preconfigured label resources is assigned.

Of the network nodes of the subnetwork CORENET which perform Layer 3 routing functions, three network nodes ISR1 to ISR3 are shown in FIG. 1 by way of example. The network nodes ISR1 to ISR3 are switch routers. The network node ISR2 is linked to the network nodes ISR1 and ISR3 via Layer 2 connections. The network node ISR3 is linked via a further Layer 2 connection to network nodes of another communications network or of another subnetwork of the communications network KN. These network nodes are switch routers of another multiprotocol label switching domain or other network nodes that perform Layer 3 routing functions. The network node ISR1 is linked via further Layer 2 connections to the network nodes AH1 to AH3 of the subnetworks ANET1 to ANET3. The network node ISR2 is linked by a further Layer 2 connection to the network node AH1.

The structure of the network nodes ISR1 to ISR3 will now be explained using the network node ISR1 as an example.

The Layer 3 router function ROUT1 serves the purpose of normal user data communication via Layer 3 routers using the IP protocol. It processes the data communication of those Layer 3 forwarding relationships which have not been assigned a shortcut.

The Layer 2 switching element SW1 is formed by e. g. ATM switching hardware which can route IP packets via ML-5 (ML=ATM Adaptation Layer, IP=Internet Protocol). The usual software for signaling is no longer needed. Instead, the switch controller SC1 controls the hardware.

The invention is not limited to ATM for the Layer 2 protocol or to IP for the Layer 3 protocol, i.e., other Layer 2 or Layer 3 protocols can also be used in the subnetworks CORENET and ANET1 to ANET3.

The switch controller SC1 processes the usual routing protocols, but it also communicates with the other switch routers of the subnetwork CORENET using a specific label distribution protocol, whereby the establishment of shortcuts through the subnetwork CORENET is made possible. The switching controller SC1 triggers the establishment of shortcuts and controls the marking of data packets with labels as well as the through-switching of such labeled data packets on Layer 2. If ATM is used, the VCI/VPI values can serve directly as labels (VCI=Virtual Channel Identifier, VPI= Virtual Path Identifier). The assignment of labels available within the subnetwork CORENET to shortcuts is coordinated using the label distribution protocol. The label resources available within the subnetwork CORENET are thus managed jointly by the switch routers of the subnetwork CORENET.

In addition to these functions which are also available in the switch controllers SC2 and SC3, the switch controller SC1 incorporates further functional groups which permit the extension of shortcuts through the network node ISR1 to the network nodes AH1 to AH3:

On the one hand, the switch controller SC1 manages the label resources available for connections between the network node ISR1 and the network nodes AH1 to AH3 and preconfigured in the network nodes AH1 to AH3 for the respective common connection with the network node ISR1. On the other hand, the switch controller SC1 incorporates functions which determine those shortcuts that can be extended through the network node ISR1 to the network nodes AH1 to AH3. To such shortcuts, the switch controller SC1 then assigns a label available for the connection with the respective network node AH1, AH2, AH3 and preconfigured in the respective network node AH1, AH2, AH3 for the respective connection with the respective network node AH1, AH2, AH3, thus extending these shortcuts through the network node ISR1 to the respective network node AH1, AH2, AH3.

The switch controller SC 1 and the switch hardware need not necessarily form a unit, but the switch controller can also be operated remote from the switch hardware. The switch hardware, in turn, can form part of a normal ATM switch with normal signaling. Then, however, the two flows must be treated separately; in particular, the ranges of VPI/VCI values for the two types must be preset by management and must not overlap.

The network nodes ISR1 to ISR3 thus process four different forms of communication:

First, normal user data communication via Layer 3 routers. This is performed by the Layer 3 forwarding functions ROUT1 to ROUT3.

Second, direct user data communication via Layer 2 switches (shortcuts). If a shortcut exists, the data packets will be marked with a label and, based on the label, be switched directly on Layer 2 through the subnetwork CORENET. The labels are assigned (label push) to the Layer 3 session e. g. at the input of the multiprotocol label switching domain, for example by the network node ISR1, translated (label swap) in intermediate nodes, for example in the network node ISR2, and removed (label pop) at the output of the multiprotocol label switching domain, for example by the network node ISR3. Direct user data communication is controlled by the switch controllers SC1 to SC3.

Third, direct user data communication via extended shortcuts. If a shortcut exists, the data packets are marked with labels and, based on the labels, switched directly on Layer 2 trough the subnetwork CORENET to a network node which is connected to the subnetwork CORENET and designed as described above. The shortcut is thus extended beyond the subnetwork CORENET.

Fourth, internal communication among the switch controllers SC1 to SC3 of the subnetwork CORENET and with the respective Layer 2 switching elements SW1, SW2, SW3. This communication is necessary to coordinate the association between the forwarding relationship on Layer 3, the IP Layer, and the labels.

The detailed structure of the network nodes AH1 and ISR1 will now be explained with reference to FIG. 2.

Figure 2:
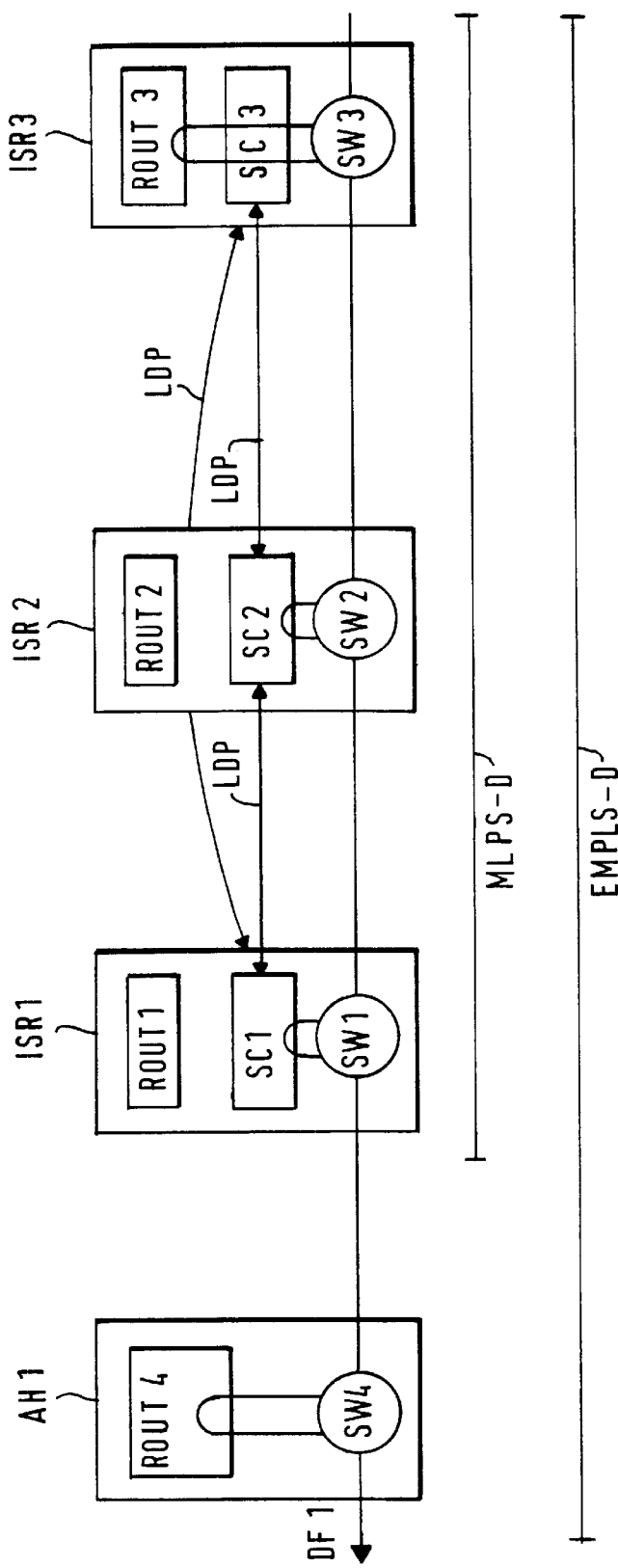
FIG. 2 is a functional block diagram of the relationship between several network nodes of the communications network of FIG. 1.

FIG. 2 shows the network elements AH1 and ISR1 to ISR3 with the Layer 3 forwarding functions ROUT1 to ROUT4, the switch controllers SC1 to SC3, the Layer 2 switching elements SW1 to SW3, and the Layer 2 switching function SW4.

The switch controllers SC1 to SC3 communicate with each other using a label distribution protocol LDP. By means of this protocol, they exchange information about label resources available in the subnetwork CORENET, whereby the establishment of shortcuts, which are each formed by a direct Layer 2 connection assigned to a Layer 3 forwarding relationship, is made possible. Furthermore, the label distribution protocol LDP is used to coordinate the assignment of labels available within the subnetwork CORENET to shortcuts, and to control the establishment of shortcuts through the subnetwork CORENET.

The switch controller SC1 further manages the assignment of the label resources available for connections between the network node ISR1 and the network nodes AH1 to AH3 and preconfigured in the network nodes AH1 to AH3 for the respective common connection with the network node ISR1. To this end, the switch controller SC1 includes, for example, a label database which contains the preconfigured label resources available for the respective common connection with the network nodes AH1 to AH3. In the label database, the label resources are assigned to that one of the network nodes AH1 to AH3 in which they are preconfigured. Furthermore, the label resources in the label database are each assigned one or more management parameters which indicate, for example, whether the respective label resource is currently busy or available for the assignment to a shortcut. A label resource can be identified in the label database by its associated label, for example by the associated VPI/VCI.

The switch controller SC1 further incorporates functions which determine those shortcuts that can be extended beyond the subnetwork CORENET. During the establishment of a shortcut which extends through the network node ISR1, these functions check whether the associated Layer 3 forwarding relationship extends to a Layer 3 routing node which is formed by a network node for which label resources have been entered in the database. For example, a check is made to determine whether such a Layer 3 forwarding relationship extends to one of the network nodes AH1 to AH3. If that is the case, an attempt is made to extend the corresponding shortcut to this network node.

Furthermore, the switch controller SC1 incorporates functions which then assign to such determined extensible shortcuts a label for the extension of the shortcut. For such shortcuts, these functions select from the label database a label resource available for the connection with the respective network node and preconfigured in the respective network node for the respective connection with the respective network node. After that, the label assigned to this label resource is assigned to the shortcut, and the label resource in the label database is marked as busy. By the assignment of the label to the shortcut, a direct Layer 2 connection is established through the network node ISR1 to the respective network node AH1 to AH3, thus extending the shortcut to this network node.

The network node AH1 is preconfigured with a set of label resources. The label resources may be preconfigured for connections with different, LDP-capable network nodes. In the network node AH1, for example, label resources are preconfigured for the connection with the network nodes ISR1 and ISR2. It is also possible, of course, that label resources are preconfigured for connections with network nodes of other subnetworks, and thus of other MPLS domains.

For the preconfiguration, the network node AH1 includes a database which contains the label resources of the preconfigured set of label resources. The database thus contains, for example, the label resources preconfigured for the connection with the network elements ISR1 and ISR2. The preconfigured label resources may be identified in this database by their labels, such as the VPIs or VCIs. Thus, the function of this database in the network node AH1 is to preconfigure the network node AH1 with a set of label resources available for connections between the network node AH1 and the network nodes ISR1 and ISR2.

The preconfiguration of the set of label resources (entry in the database, preconfiguration of the individual resources) takes place during the booting of the network node AH1. It is also possible to carry out the preconfiguration by means of the network management system. On point-to-point links the label ranges could also be standardized.

The network node AH1 monitors the preconfigured label resources stored in the database, and treats the entire user data communication, which is carried out via these communications resources reserved as label resources, as shortcut communication: The network node AH1 accepts all Layer 2 packets to which such a preconfigured label from the set of preconfigured label resources has been assigned, and routes them to the Layer 3 routing function ROUT4 for further processing. A data stream DF1 passing the network nodes ISR3, ISR2, ISR1, and AH1 is processed by these network nodes ISR3, ISR2, ISR1, and AH1 as follows:

The network nodes ISR1 to ISR3 form an MPLS domain MPLS-D. Within this domain, the data stream DF1 is assigned a shortcut, so that the data stream DF1 is switched through the MPLS domain MPLS-D via a direct Layer 2 connection. This shortcut is extended by the network node ISR1 to the network node AH1. As a result, the data stream is also switched through the network node ISR1 via a direct Layer 2 connection. Thus, in the network node ISR1, no processing of the data stream DF1 by means of a Layer 3 forwarding function is needed, either. With respect to the data stream DF1, the MPLS domain MPLS-D thus becomes an expanded MPLS domain EMPLS-D.

What is claimed is:

1. A method of supporting communication between a first network node (AH1) and a second network node (ISR1) of a communications network (KN), said method comprising exchanging information about label resources between the second network node (ISR1) and one or more further network nodes (ISR2, ISR3) of the communications network using a label distribution protocol (LDP), whereby the establishment of shortcuts, each of which is formed by a direct Layer 2 connection assigned to a Layer 3 forwarding relationship, is made possible between the second network node (ISR1) and the further network nodes (ISR2, ISR3), characterized in that the first network node (AH1), instead of exchanging information about label resources with the second network node using a label distribution protocol, is preconfigured with a set of label resources, that the second network node (ISR1) manages the assignment of the label resources available for a connection between the first network node (AH1) and the second network node (ISR1) and preconfigured in the first network node (AH1), and that the second network node (ISR1) assigns to a shortcut one of the labels of the preconfigured set of label resources which are available for the connection with the first network node (AH1), thereby extending sold shortcut through the second network node (ISR1) to the first network node (AH1).

2. A method as claimed in claim 1, characterized in that as the label resources, ATM Layer 2 connections between the first network node (AH1) and the second network node (ISR1) are preconfigured.

3. A method as claimed in claim 1, characterized in that the set of label resources is preconfigured during the booting of the first network node (AH1).

4. A method as claimed in claim 1, characterized in that the set of label resources is preconfigured by the network management in the first network node (AH1).

5. A method as claimed in claim 1, characterized in that the label ranges for preconfiguration are standardized.

6. A method as claimed in claim 1, characterized in that the first network node (AH1) is formed by a network node of an access network (ANET1).

7. A communications network (KN) comprising a first network node (AH1), a second network node (ISR1), and one or more further network nodes (ISR2, ISR3), the second network node (ISR1) and the one or more further network nodes (ISR2, ISR3) comprising switch controllers (SC1 to SC3) which are designed to exchange information about label resources using a label distribution protocol (LDP), whereby the establishment of shortcuts, each of which is formed by a direct Layer 2 connection assigned to a Layer 3 forwarding relationship, is made possible between the second network node (ISR1) and the further network nodes (ISR2, ISR3), characterized in that the first network node (AH1) is preconfigured with a set of label resources, that the second network node (ISR1) comprises means for managing the assignment of the label resources available for a connection between the first network node (AH1) and the second network node (ISR1) and preconfigured in the first network node (AH1), and that the second network node (ISR1) further comprises means designed to assign to shortcuts a respective one of the labels of the set of label resources available for the connection with the first network node (AH1) and preconfigured in the first network node (AH1), thereby extending said shortcuts through the second network node (ISR1) to the first network node (AH1).

8. A network node (ISR1) for a communications network (KN) which further comprises a first network node (AH1) and one or more further network nodes (ISR2, ISR3), said network node (ISR1) comprising a switch controller (SC1) designed to exchange information about label resources with said one or more further network nodes (ISR2, ISR3) using a label distribution protocol (LDP), whereby the establishment of shortcuts, each of which is formed by a direct Layer 2 connection assigned to a Layer 3 forwarding relationship, is made possible between the network node (ISR1) and the further network nodes (ISR2, ISR3), characterized in that the network node (ISR1) further comprises means for managing the assignment of label resources available for a connection between the network node (ISR1) and the first network node (AH1) and preconfigured in the first network node (AH1), and that the network node (ISR1) further comprises means designed to assign to shortcuts a respective one of the preconfigured labels available for the connection with the first network node (AH1) and preconfigured in the first network node (AH1), thereby extending said shortcuts through the network node (ISR1) to the first network node (AH1).

9. A switch controller (SC1) for a second network node (ISR1) of a communications network (KN) which further comprises a first network node (AH1) and one or more further network nodes (ISR2, ISR3), the switch controller (SC1) being designed to exchange information about label resources with said one or more further network nodes (ISR2, ISR3) using a label distribution protocol (LDP), whereby the establishment of shortcuts, each of which is formed by a direct Layer 2 connection assigned to a Layer 3 forwarding relationship, is made possible between the second network node (ISR1) and the further network nodes (ISR2, ISR3), characterized in that the switch controller (SC1) comprises means for managing the assignment of label resources available for a connection between the second network node (ISR1) and the first network node (AH1) and preconfigured in the first network node (AH1), and that the switch controller (SC1) further comprises means designed to assign to shortcuts a respective one of the labels available for the connection with the first network node (AH1) and preconfigured in the first network node (AH1), thereby extending said shortcuts through the second network node (ISR1) to the first network node (AH1).

10. A first network node (AH1) for a communications network (KN) which further comprises a second network node (ISR1) and one or more further network nodes (ISR2, ISR3), the first network node (AH1) having an interface for interfacing it to the second network node (ISR1), which is designed to exchange information about label resources with said one or more further network nodes (ISR2, ISR3) using a label distribution protocol (LDP), whereby the establishment of shortcuts, each of which is formed by a direct Layer 2 connection assigned to a Layer 3 forwarding relationship, is made possible between the second network node (ISR1) and the further network nodes (ISR2, ISR3), characterized in that the first network node (AH1) comprises means for preconfiguring it with a set of label resources available for a connection between the second network node (ISR1) and the first network node (AH1), the assignment of said label resources being managed exclusively by the second network node (ISR1), and that the first network node (AH1) further comprises means designed to monitor the traffic which is labeled with preconfigured label resources and to treat the connections extending via the preconfigured label resources as shortcuts.

* * * * *